US010017091B2

(12) United States Patent
Beiler

(10) Patent No.: US 10,017,091 B2
(45) Date of Patent: Jul. 10, 2018

(54) SELF-PROPELLED TRAILER

(71) Applicant: New Heights LLC, Paradise, PA (US)

(72) Inventor: Aaron Jay Beiler, Gap, PA (US)

(73) Assignee: New Heights LLC, Leola, PA (US)

( * ) Notice: Subject to any disclaimer, the term of this patent is extended or adjusted under 35 U.S.C. 154(b) by 72 days.

(21) Appl. No.: 14/567,349

(22) Filed: Dec. 11, 2014

(65) Prior Publication Data

US 2016/0167558 A1    Jun. 16, 2016

(51) Int. Cl.
| | |
|---|---|
| *B65F 3/00* | (2006.01) |
| *B60P 1/34* | (2006.01) |
| *B60P 1/32* | (2006.01) |
| *B62D 59/04* | (2006.01) |
| *B60P 1/00* | (2006.01) |
| *B60P 1/02* | (2006.01) |
| *B60P 1/04* | (2006.01) |

(52) U.S. Cl.
CPC ............... *B60P 1/34* (2013.01); *B60P 1/003* (2013.01); *B60P 1/02* (2013.01); *B60P 1/04* (2013.01); *B60P 1/32* (2013.01); *B62D 59/04* (2013.01)

(58) Field of Classification Search
CPC ........................................................ A61G 3/06
USPC ................................. 414/481, 482, 546, 547
See application file for complete search history.

(56) References Cited

U.S. PATENT DOCUMENTS

| | | |
|---|---|---|
| 172,454 A | 1/1876 | Kramer |
| 175,385 A | 3/1876 | Steward |
| 545,264 A | 8/1895 | Booth et al. |
| 1,390,122 A | 9/1921 | Carlson |
| 1,497,489 A | 6/1924 | Cochran |
| 1,546,261 A | 7/1925 | Spencer |
| 1,942,319 A | 1/1934 | Wright |
| 1,985,169 A | 12/1934 | Howell et al. |
| 2,178,841 A | 11/1939 | Lienemann |
| 2,332,326 A | 10/1943 | Lex |
| 2,345,159 A | 3/1944 | Schroter |
| 2,387,568 A | 10/1945 | Drott et al. |
| 2,391,948 A | 1/1946 | Couse |
| 2,427,132 A | 9/1947 | Godbey |
| 2,436,017 A | 2/1948 | Powers |
| 2,867,339 A | 1/1959 | Nelson |
| 3,019,054 A | 1/1962 | Stahly |
| 3,035,722 A | 5/1962 | Anderson et al. |
| 3,092,273 A | 6/1963 | Schramm |

(Continued)

FOREIGN PATENT DOCUMENTS

| | | |
|---|---|---|
| FR | 2268666 A1 | 11/1975 |
| FR | 2750411 | 6/1997 |

(Continued)

OTHER PUBLICATIONS

PCT Notification, International Search Report and Written Opinion, dated Mar. 31, 2016, 12 pages.

*Primary Examiner* — Saul Rodriguez
*Assistant Examiner* — Willie Berry, Jr.
(74) *Attorney, Agent, or Firm* — Barley Snyder

(57) ABSTRACT

A self-propelled trailer is provided and includes a frame, an extension device, and a storage bin. The extension device includes a first extension section with a trailing end rotatably connected to the frame and an extendable second extension section rotatably connected to a leading end of the first extension section. The storage bin is secured to the extension device.

35 Claims, 11 Drawing Sheets

(56) References Cited

U.S. PATENT DOCUMENTS

| | | |
|---|---|---|
| 3,106,304 A | 10/1963 | Smale |
| 3,473,679 A | 10/1969 | Weichel |
| 3,619,007 A | 11/1971 | Phillips |
| 3,768,670 A | 10/1973 | Cloud |
| 3,800,966 A | 4/1974 | Newton |
| 3,902,616 A | 9/1975 | Megele |
| 3,987,563 A | 10/1976 | Boos |
| 4,091,943 A | 5/1978 | Bay-Schmith |
| 4,568,028 A | 2/1986 | Verseef et al. |
| 4,676,330 A | 6/1987 | Roberts |
| 4,700,851 A | 10/1987 | Reeve et al. |
| 4,840,532 A | 6/1989 | Galbreath |
| 4,951,999 A | 8/1990 | Rudolph et al. |
| 5,000,645 A | 3/1991 | Polojarvi |
| 5,069,507 A | 12/1991 | Vurness |
| 5,393,193 A | 2/1995 | Dagg |
| 5,490,755 A | 2/1996 | Billotte |
| 5,492,402 A | 2/1996 | Alton |
| 5,542,803 A | 8/1996 | Driggs |
| 5,580,134 A | 12/1996 | Allwine |
| 5,662,453 A | 9/1997 | Gerstner et al. |
| 5,720,526 A | 2/1998 | Roberts |
| 5,829,605 A | 11/1998 | Poitras |
| 5,975,832 A | 11/1999 | Winkler |
| 6,019,568 A | 2/2000 | Bratlie |
| 6,042,175 A | 3/2000 | Williams |
| 6,129,226 A | 10/2000 | Donovan |
| 6,217,122 B1 | 4/2001 | Kirbie |
| 6,220,811 B1 | 4/2001 | Bernecker |
| 6,238,166 B1 | 5/2001 | Collier |
| 6,254,192 B1 | 7/2001 | Spreitzer |
| 6,309,164 B1 | 10/2001 | Holder et al. |
| 6,386,573 B1 | 5/2002 | Solomon |
| 6,402,224 B1 | 6/2002 | Monaco et al. |
| 6,409,275 B1 | 6/2002 | Gerding |
| 6,527,494 B2 | 3/2003 | Hurlburt |
| 6,547,509 B1 | 4/2003 | Edmo |
| 6,558,104 B1 | 5/2003 | Vlaanderen et al. |
| 6,688,836 B2 | 2/2004 | Gourand |
| 6,789,829 B1 * | 9/2004 | Kapels .............. B62D 33/02 296/11 |
| 6,817,677 B1 * | 11/2004 | Beiler .............. B60P 1/34 298/21 R |
| 7,037,062 B2 | 5/2006 | Oliver |
| 7,172,083 B1 | 2/2007 | Raines |
| 7,665,285 B1 | 2/2010 | Harada et al. |
| 7,743,859 B2 | 6/2010 | Forsyth |
| 8,136,270 B1 | 3/2012 | Wammock |
| 8,215,717 B2 | 7/2012 | Stewart |
| 8,876,216 B2 | 11/2014 | Stewart |
| 9,327,632 B1 * | 5/2016 | Bartel .............. B60P 1/34 |
| 9,340,138 B2 * | 5/2016 | Piekny .............. B60P 1/34 |
| 2005/0253445 A1 | 11/2005 | Beiler |
| 2008/0211289 A1 | 9/2008 | Beiler |
| 2009/0277857 A1 | 11/2009 | Rice |
| 2013/0133172 A1 | 5/2013 | Kiener et al. |

FOREIGN PATENT DOCUMENTS

| | | |
|---|---|---|
| FR | 2750411 A1 | 6/1997 |
| FR | 2867432 | 10/2004 |
| FR | 2867432 A1 | 3/2010 |
| JP | 401052538 A | 2/1989 |
| WO | 2004083081 A2 | 9/2004 |

\* cited by examiner

US 10,017,091 B2

SELF-PROPELLED TRAILER

FIELD OF THE INVENTION

The invention relates to a self-propelled trailer and, more particularly, to a self-propelled trailer having a rear extending storage bin.

BACKGROUND

Workers often find that providing materials for replacement of a building roof is very time consuming, considering the task involves using different mechanical units or manual labor to lift building materials from a truck and position them on a roof. Furthermore, stripping old material from the building roof in order to put on a new roof is also time consuming and a dirty job. Generally, old material is thrown from the roof to the ground around the building and then workers manually pick up debris to deposit it into a disposal container. Even if the material can be thrown directly into a container there remain the problems of getting the disposal container in proximity to the roof and removal from the work site. The most common solution to the disposal problem is to move a dump truck adjacent to the building and to attempt to throw the material directly from the roof into the truck bin. Furthermore, the problem is not limited to roofing material. Any building remodeling generates significant construction trash, and the most convenient method of removing it from the building is to throw it out a window.

As a result, it is not always possible to move a large truck into a location adjacent to a building. Fences, lawns, and shrubs can be damaged by any size truck, especially a large transport truck.

There is a need for a vehicle that can move around the typical landscaped yard surrounding a building and position a storage bin into an extended position near workers.

SUMMARY

In view of the foregoing, a self-propelled trailer is provided. The self-propelled trailer includes a frame, an extension device, and a storage bin. The extension device includes a first extension section with a trailing end rotatably connected to the frame and an extendable second extension section rotatably connected to a leading end of the first extension section. The storage bin is secured to the extension device.

BRIEF DESCRIPTION OF THE DRAWINGS

The invention is explained in greater detail below with reference to embodiments and the appended drawings of which.

DETAILED DESCRIPTION OF THE EMBODIMENT(S)

Figure 1:
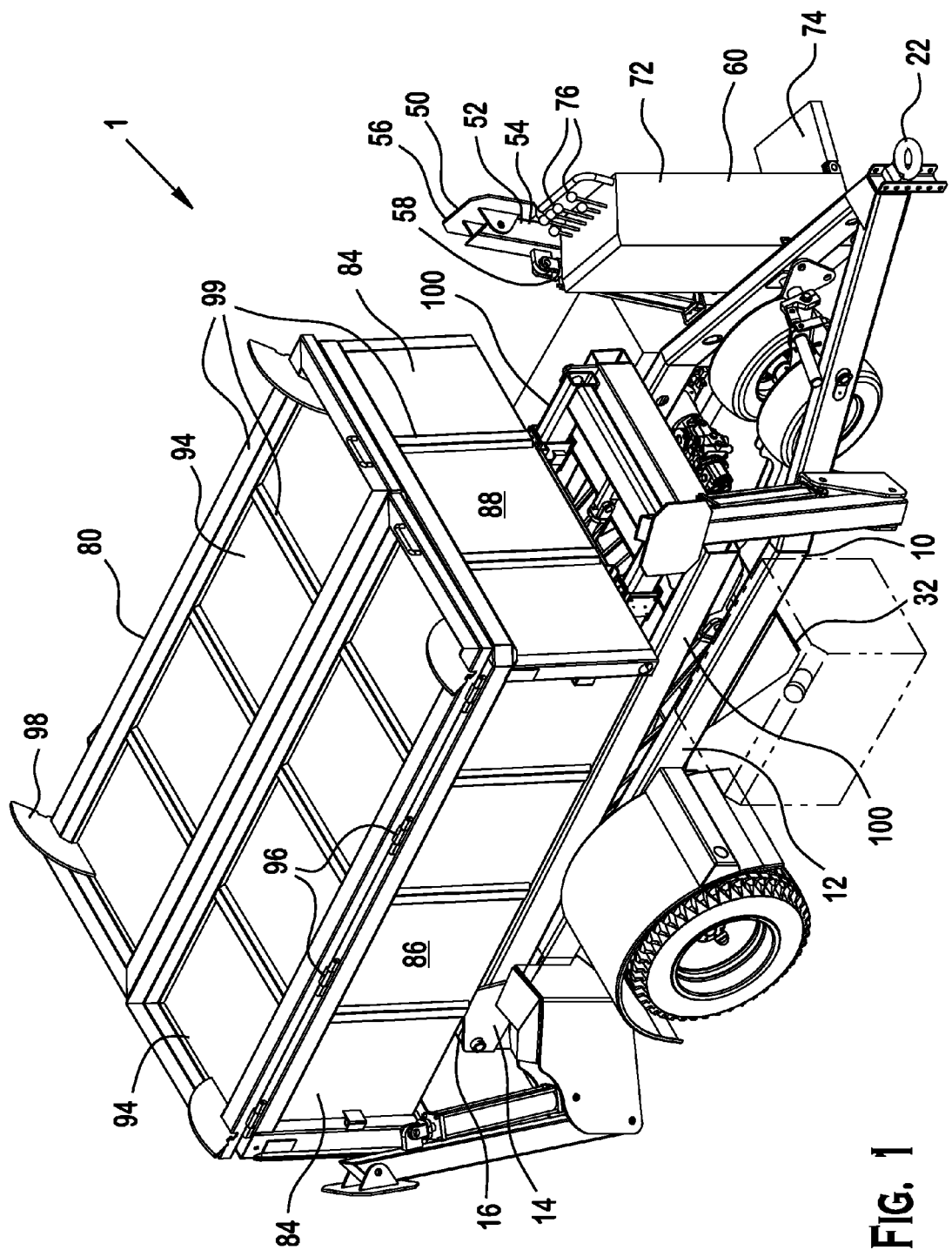
FIG. 1 is a perspective view of a trailer according to the invention.

With respect to FIGS. 1-9, a trailer 1 according to the invention is shown and ready for towing by a power vehicle, such as a truck with a tow hitch. The trailer 1 generally includes the following major components: a frame 10, a plurality of stabilizers 50, a drive system 60, a storage bin 80, and an extension device 100.

Now with reference to FIGS. 1-4, the frame 10 will be discussed. In the shown embodiment, the frame 10 includes a plurality of support beams 12, a plurality of connecting beams 20, a trailer hitch 22, a pair of drive wheels 24, a pair of steerable wheels 28, and a first actuator support 32.

Figure 2:
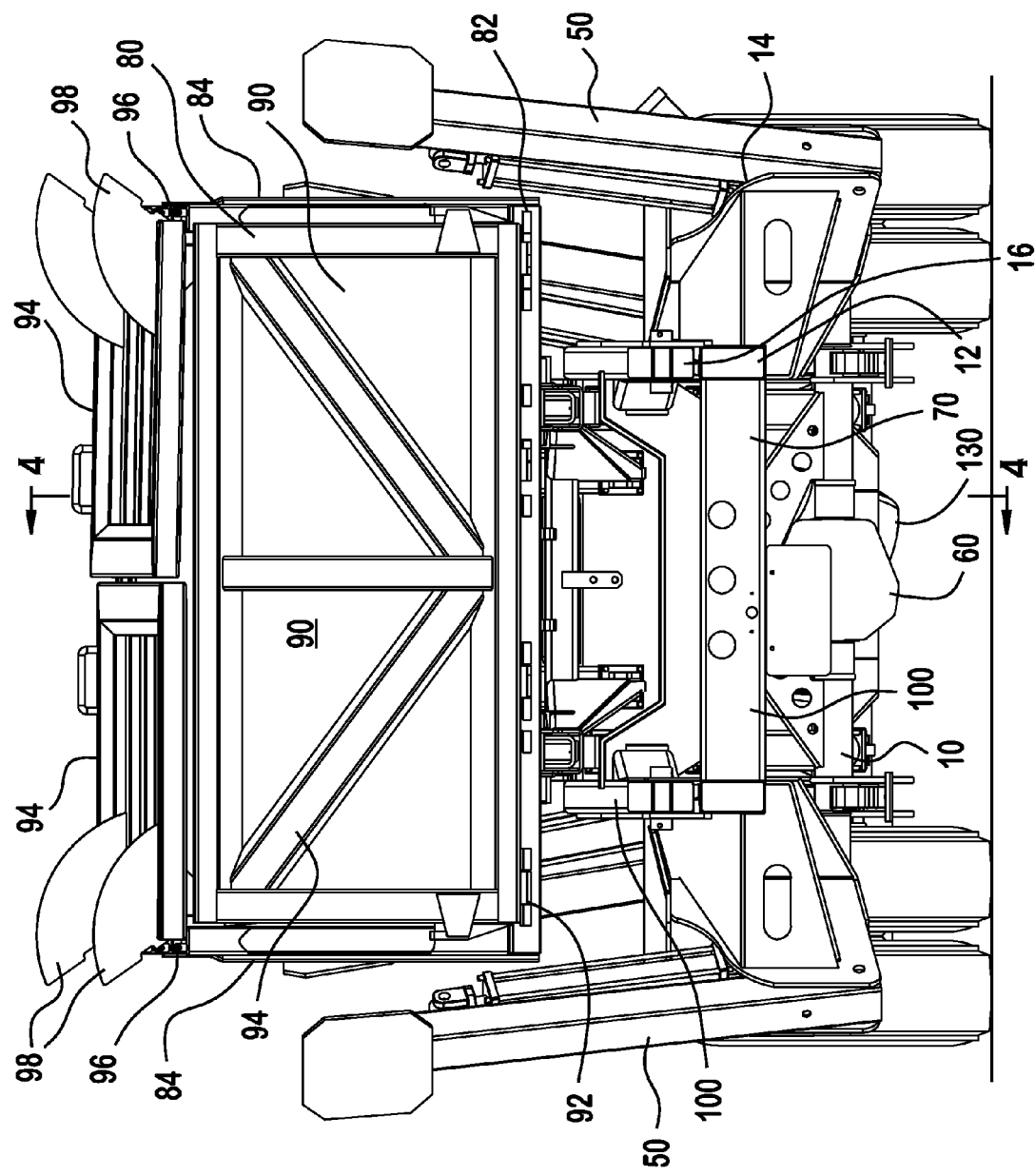
FIG. 2 is a rear view of the trailer of FIG. 1.
Figure 3:
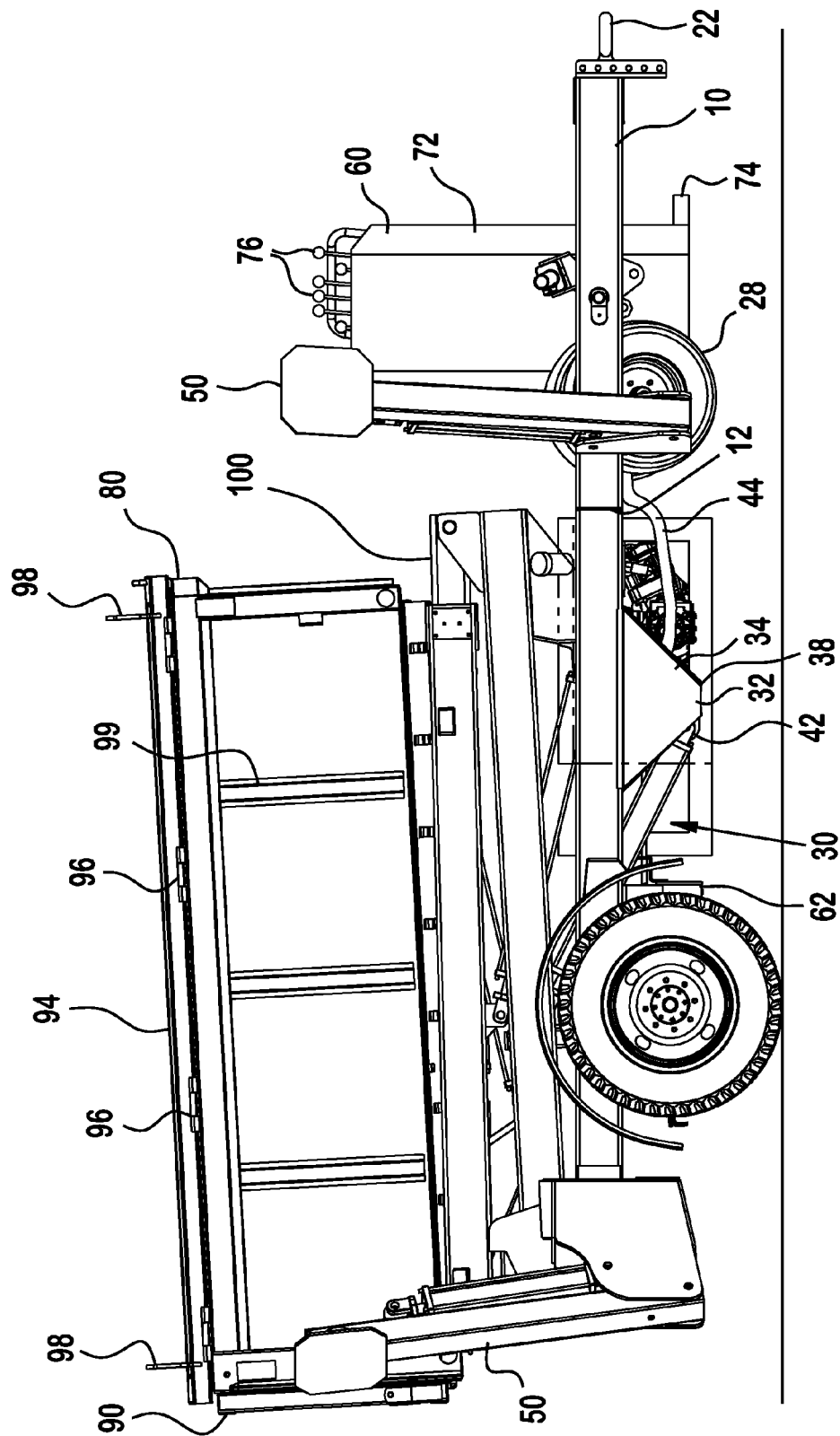
FIG. 3 is a side view of the trailer of FIG. 1.

As shown in FIGS. 2 and 3, each support beam 12 is an elongated metal support extending along a length of the frame 10, from a trailing end to a leading end thereof.

Each connection beam 20 runs substantially perpendicular and connecting to the plurality of support beams 12 to form an undercarriage chassis 30. Each support beam 12 includes a first extension receiving bracket 14 positioned along a trailing end of the frame 10. Each first extension receiving bracket 14 includes support arm receiving space 16 and a fastener receiving through-hole 18 extending completely there through.

The trailer hitch 22 is positioned and connected to a leading end of the frame 10, and, in particular, the plurality of support beams 12. The trailer hitch 22 includes a connector for connecting with a truck (i.e. ball mount).

Figure 4:
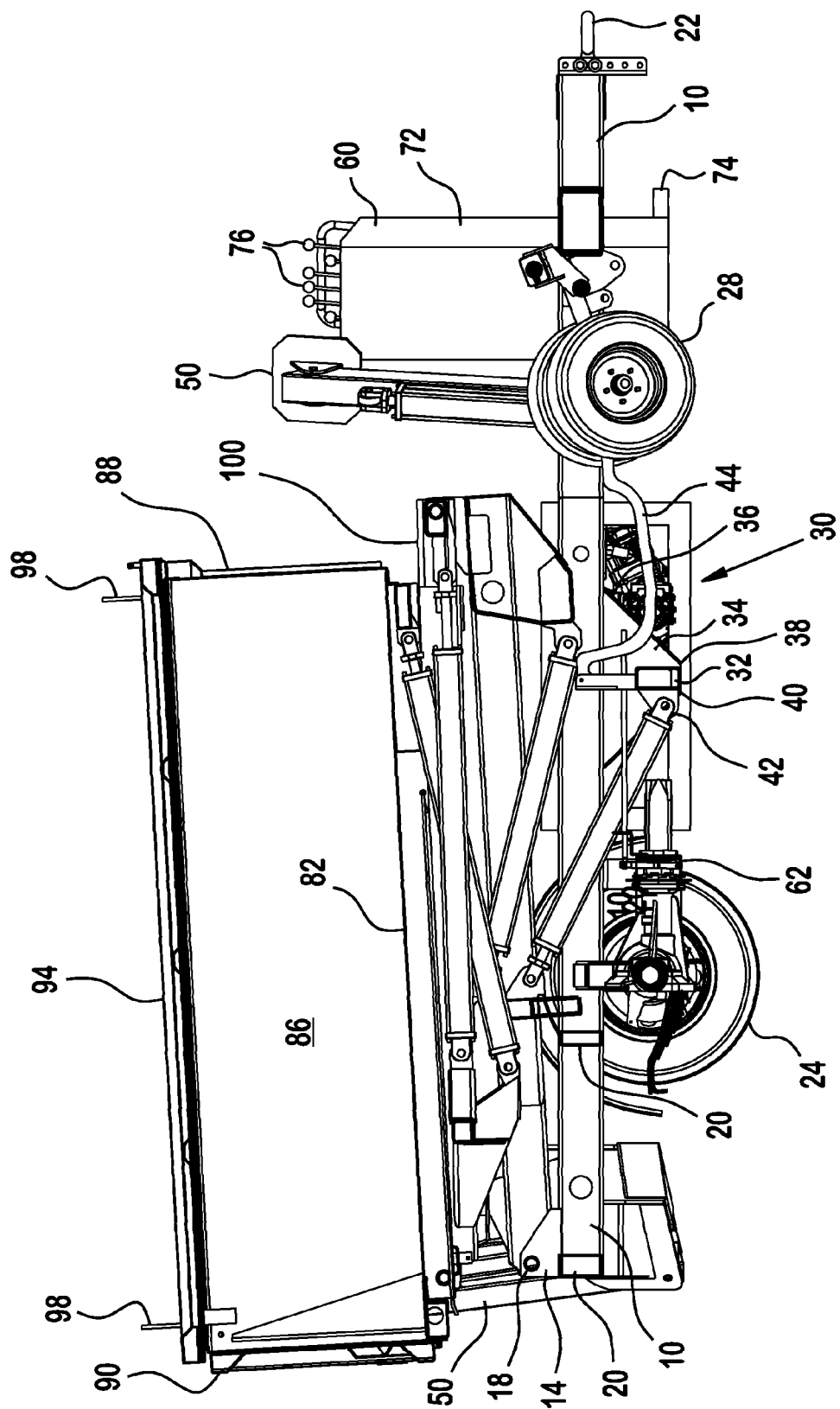
FIG. 4 is a sectional side view of the trailer of FIG. 3 taken along line 4-4 of FIG. 2.

The drive wheels 24 are positioned under the undercarriage chassis 30, while the steerable wheels 28 are positioned between the trailer hitch 22 and the rear drive wheel 24, as shown in the exemplary embodiment of FIG. 4. However, one skilled in the art would appreciate that other designs are possible. For instance, the steerable wheels 28 may also be positioned at different positions along the undercarriage chassis 30.

Figure 5:
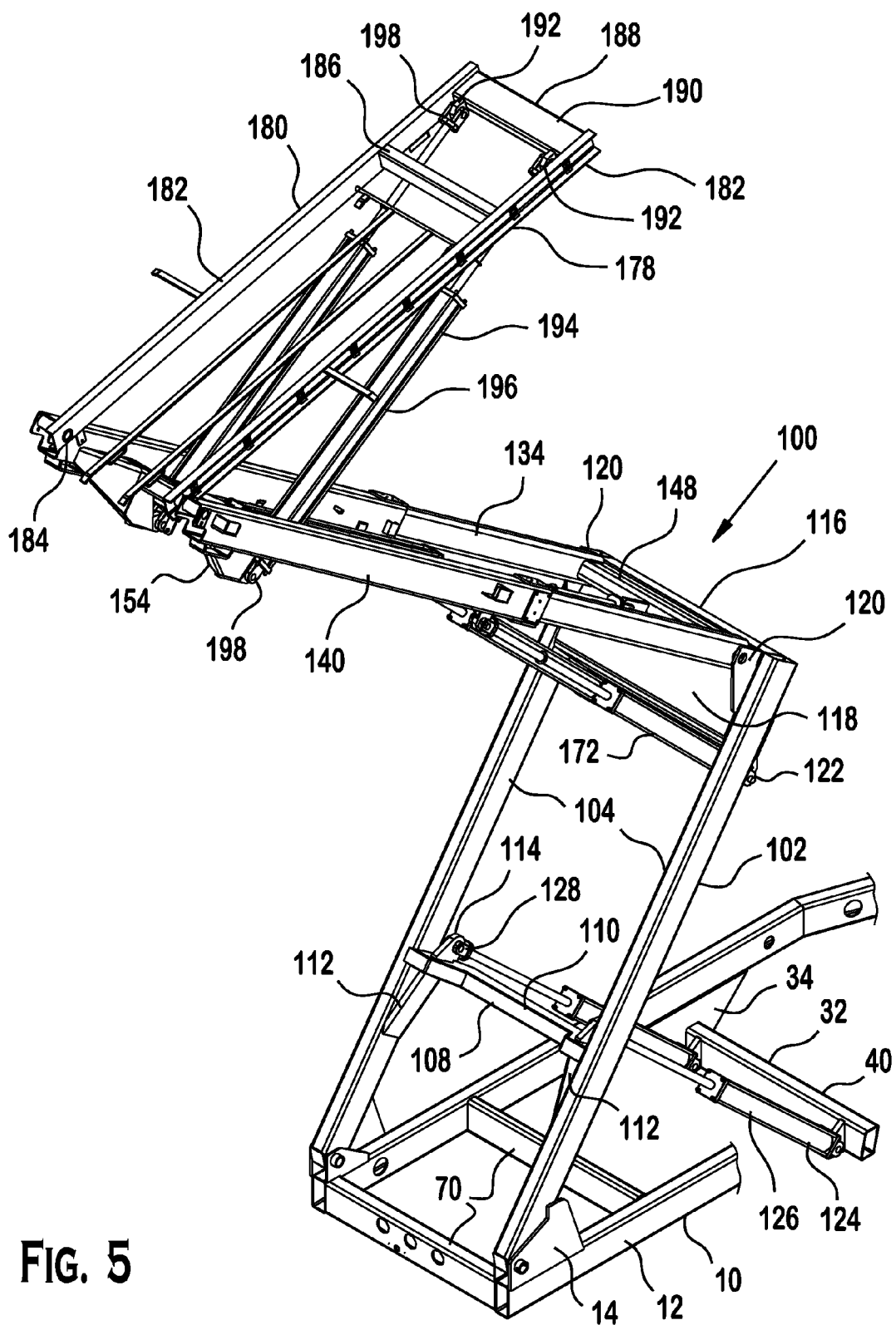
FIG. 5 is a perspective view of the trailer's extension device having a plurality of extension platforms.

As shown in FIGS. 3-5, the first actuator support 32 includes a pair of lower braces 34, a cross member 40, a pair of actuator receiving brackets 42, and a front wheel retraction system 44. In the shown embodiment, the pair of lower braces 34 extend downward from the pair of support beams 12 at an approximate center of the frame 10. In the shown embodiment, each lower brace 34 is a shaped triangular plate having a base 36 mechanically secured to the support beam 12 and an apex 38 extending away there from. The cross member 40 is a tubular metal support extending between and mechanically secured to an inner surface of the pair of lower braces 34 along the apex 38. The pair of actuator receiving brackets 42 are disposed along the cross member 40 and mechanically secured there to. In the shown embodiment, each actuator receiving bracket 42 is an eye bracket. However, one skilled in the art should appreciate other known brackets or braces could be used. In addition, one skilled in the can appreciate that one or more actuator receiving brackets can be used and positioned at different locations along cross member 40. The front wheel retraction system 44 connects to the cross member 40 and includes a rotating lever device 46 that extends and connects to the steerable wheels 28. The rotating lever device 46 includes one or more pivot points. One of ordinary skill in the art would appreciate that "mechanically secured" may include any common mechanical securing methods, such as bolts, screws, or welding.

Now with reference to FIGS. 1-4, the stabilizers 50 will be discussed. As shown, each stabilizer 50 includes an outrigger 52 and a stabilizing actuator 58. The stabilizers 50 are positioned near at least the rear corners of the trailer 1 in the shown embodiment. However, one skilled in the art would appreciate that other designs are possible, having one more or less stabilizers than what is shown.

As shown, each outrigger 52 includes an arm 54 pivotably connected to frame 10 and a brace 56 pivotably connected to an end of the arm 54. One end of the stabilizing actuator 58 connects to the frame 10, while an opposite end connects to the arm 54.

Now with reference to FIGS. 1-4, the drive system 60 will be discussed and generally includes a power system 62 and a control system 72 connected to the power system 62.

In the shown embodiment, the power system 62 includes an internal combustion engine (not shown), a battery (not shown) connected to the combustion engine (not shown), a hydraulic motor (not shown) also connected to the combustion engine (not shown), a hydraulic pump (not shown) connected to the hydraulic motor (not shown). Many of the power system components are not shown for sake of complexity in the drawings, although a discussion is provided for purposes of enabling one skilled in the art to understand how the drive system is assembled and performed.

The small internal combustion engine (not shown) powers the drive system 60. However, the drive system 60 could be powered by other known mechanisms including an electric motor powered by a battery or other sources. In the shown embodiment, the power system 62 is interconnected with drive wheels 24 by a hydraulic motor (not shown) installed adjacent to the drive wheels 24 and interconnected to the hydraulic pump (not shown) by hydraulic lines.

One skilled in art should appreciate that other designs are possible. For instance, the power system 62 may include other methods to move the drive wheels 24, including chains, belts, or a drive shaft and a transmission connected to the combustion engine (not shown), so that trailer 1 can be moved around a work site under its own power.

Regardless of the specific mode of powering the drive wheels 24, the power system 62 connects to the control system 72 for starting, and stopping the drive wheels 24, as well as for regulating the speed of the drive wheels 24. The control system 72 includes a plurality of controls which may be a series of buttons, levers, or other suitable controls which allow the operator to control retracting, lowering, and steering of the steerable wheels 28, and power to the drive wheels 24, as well as adjusting the stabilizer 50.

In an embodiment, user controls may be provided on the control system 72 for controlling certain other features of the trailer 1. As shown in the embodiment of FIG. 1, an operator stand may be provided in the vicinity of the control system 72, allowing an operator to move along with the trailer 1 as the operator controls the trailer 1 movement. The control system 72 therefore provides the operator with the ability to control all features of the trailer 1 from a single location, while standing on the operator stand and moving along with the trailer 1 as the trailer 1 travels under its own power.

In the shown embodiment, the steerable wheels 28 are a pair of wheels mounted together on a common axle and steered by direct connection to the hydraulic pump (not shown) through hydraulic lines. However, one skilled in the art should appreciate that other designs are possible, including a conventional steering wheel. In combination with the powered drive wheels 26 and steerable wheels 28, the trailer 1 can effortlessly move around a work site, even when storage bin 80 bears a full load of building materials.

Now with reference to FIGS. 1-4, the storage bin 80 generally includes a platform 82, a plurality of retaining walls 84, a tailgate 90, and a pair of cover sections 94.

The platform 82 includes a planar section extending substantially parallel with the frame 10. In the shown embodiment, the platform 82 is a rectangular metal plate. However, one skilled in the art should appreciate that the platform 82 could be manufactured using different shapes and other materials, such as lumber, composite, and other metals. For instance, the platform 82 may include a framed metal structure on which a plurality of wood planks are arranged.

The plurality of retaining walls 84 includes a pair of side retaining walls 86 and a retaining end wall 88. In the shown embodiment, each retaining wall 84 is metal plate. However, one skilled in the art should appreciate that each retaining wall 84 could be manufactured using other materials, such as lumber, composite, and other metals. For instance, each retaining wall 84 may include a framed metal structure on which a plurality of wood planks is disposed along the framed metal structure.

The plurality of retaining walls 84 is positioned and secured along outer edges of the platform 82 and, in particular, along a top planar surface thereof. In the shown embodiment, the pair of side retaining walls 86 are positioned along opposite longitudinal sides of the platform 82, while the retaining end wall 88 is positioned at trailing end of the platform 82. Each retaining wall 84 extends substantially perpendicular with respect to the top planar surface of the platform 82. Each retaining wall 84 is mechanically secured to the platform 82, for instance, using a weld or plurality of known mechanical fasteners. In addition, the retaining end wall 88 is secured to a pair of common ends of the side retaining walls 86. In the embodiment shown, the retaining end wall 88 is mechanically secured to the pair of side retaining walls 86, for instance, using a weld or other known mechanical fasteners or adhesives.

As shown, the tailgate 90 is positioned along a leading end of the platform 82, opposite the retaining end wall 88 positioned along the trailing end thereof. In the embodiment shown, the tailgate 90 is made of a metal. However, one skilled in the art should appreciate that the tailgate 90 could be manufactured using other materials, such as lumber, composite, and other metals. For instance, tailgate 90 may include a framed metal structure on which a plurality of wood planks is disposed along the framed metal structure.

As shown, the tailgate 90 is positioned along an outer edge of the platform 82 and extends substantially perpendicular to the top planar surface thereof. The tailgate 90 is secured to the platform 82, for instance, through a rotating fastener device, such as a rotating hinge 92 positioned at bottom of the tailgate 90 and connecting to the platform 82. The rotating hinge 92 permits rotation of the tailgate 90 from a secured closed vertical position to one in which the tailgate 90 rotates away from the retaining end wall 88 making the platform 82 accessible. However, one skilled in the art should appreciate that other design are possible. For instance, the tailgate 90 may be pivotably mounted to side retaining walls 86 such that the tailgate 90 pivots away from the outer edge of the platform 82 or from the side retaining walls 86, much like known dump trucks.

Each cover section 94 is a rectangular metal structure having a planar surface. Each cover section 94 is positioned along and connected to upper outer edges of the pair of side retaining walls 86 using a plurality of hinges 96. However, one skilled in the art should appreciate that other designs are possible. For instance, other known rotating mechanisms could be used. Each cover section 94 measures approximately half a width as measured between the pair of side retaining walls 86.

A pair of stops 98 are provided and positioned along a common side at opposite ends of the cover section 94. In particular, each stop 98 is disposed along an outer edge of the cover section 94 that is proximate to the side retaining wall 86 when assembled. Each stop 98 is a metal plate having one end secured to the cover section 94. In an exemplary embodiment, the stop 98 is semi-circle shaped having a free end configured to abut the side retaining wall 86 when the cover section 94 rotates about the hinge 96. The stop 98 configuration determines that angle at which the cover section 94 is positioned in an open position. For instance, if the stop 98 has a 135 degree semi-circle shape, then the cover section 94 will be positioned at a 45 degree angle with respect to a plane extending across top surfaces of both side retaining walls 86.

In the shown embodiment, a plurality of wall supports 99 are provided and disposed along outer surfaces of the platform 82, the retaining walls 84, the tailgate 90, and the cover sections 94. The wall supports 99 provide reinforcement for the planar surfaces of each of the outer surfaces. In the shown embodiment, each wall support 89 is a tubular structure of metal that is mechanically secured to the outer surfaces, for instance, using a weld. However, one skilled in the art should appreciate that other known fastening means are possible, including but not limited to screws, nuts and bolts, and adhesives.

Now with references to FIGS. 5-9, the extension device 100 according to the invention will be described. As shown, the extension device 100 includes the following major components: a first extension section 102, a second extension section 134, and a storage bin platform section 178.

Figure 6:
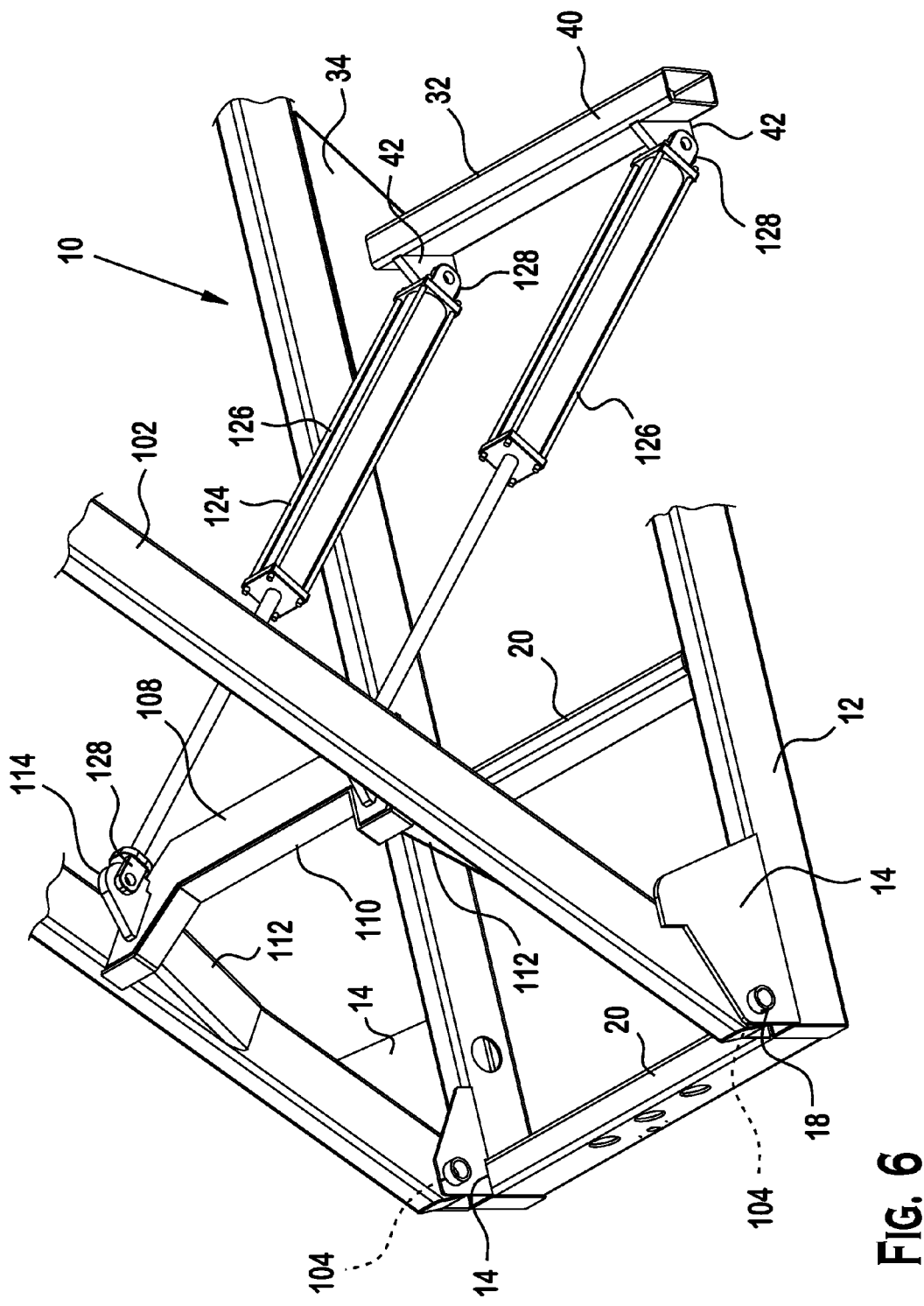
FIG. 6 is a close up perspective view of part of the extension device of FIG. 5.

With reference to FIGS. 5 and 6, the first extension section 102 is shown and generally includes a pair of lower supports 104, a lower cross member support 108, an upper extension support 116, and a pair of lower lifting actuators 124.

Each lower support 104 is an elongated structural beam and, in the shown embodiment, a tubular metal beam. Each lower support 104 includes a fastener receiving through-hole 106 positioned at a trailing end thereof and extending completely there through. The pair of lower supports 104 are positioned parallel to each other and secured in positioned using the lower cross member support 108 that is positioned between the trailing end and the leading end.

The lower cross member support 108 includes a lower support plate 110, a pair of braces 112, a pair of first actuator receiving brackets 114. In the shown embodiment, the lower support plate 110 is a u-shaped metal plate extending between and secured to the pair of lower supports 104. The lower support plate 110 is mechanically secured to facing inner surfaces of the pair of lower supports 104, for instance, using a weld or other known mechanical fasteners. One skilled in the art should appreciate that other shapes and design are possible. For, instance, the lower support plate 110 could be manufactured rectangular or tubular.

Each brace 112 is positioned at opposite ends of lower support plate 110, along inner surfaces of the pair of lower supports 104. Each brace 112 is a metal structural brace and triangular shaped in the shown embodiment. Each brace 112 is secured to the lower support plate 110 and the one of the pair of lower supports 104.

The pair of first actuator receiving brackets 114 are also disposed along and mechanically secured to the lower support plate 110, opposite the pair of braces 112. In the shown embodiment, each first actuator receiving bracket 114 is an eye bracket. However, one skilled in the art should appreciate other known brackets or braces could be used. In addition, one skilled in the can appreciate that one or more actuator receiving brackets can be used and positioned at different locations along lower support plate 110.

Figure 7:
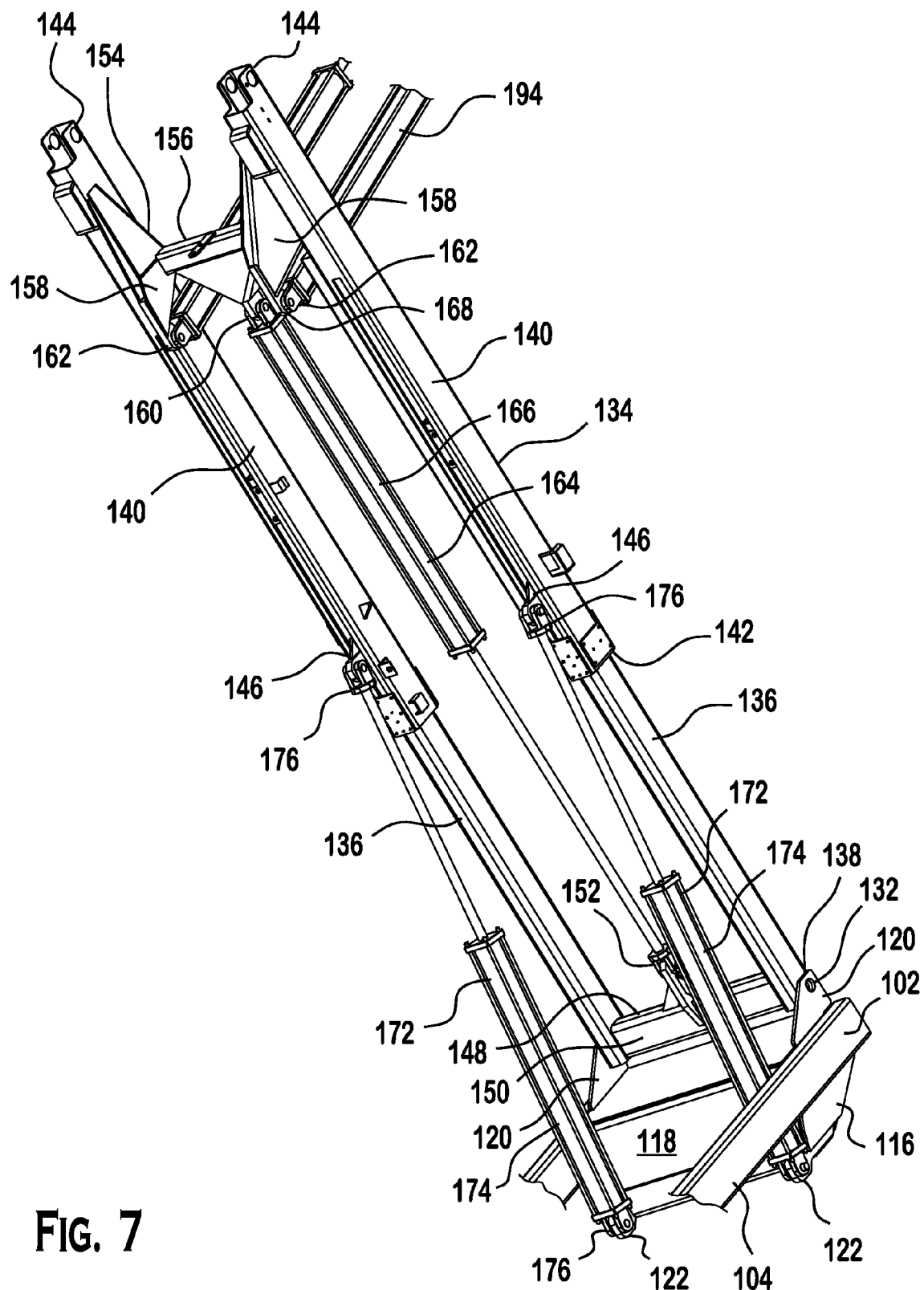
FIG. 7 is another close up perspective view of another part of the extension device of FIG. 5.

As specifically shown in FIG. 7, the upper extension support 116 includes a support box 118, a pair of second extension receiving brackets 120, and a pair of second actuator receiving brackets 122. In the shown embodiment, the upper extension support 116 is positioned between and secured to the pair of lower supports 104 along a leading end thereof.

In the shown embodiment, the support box 118 is a rectangular shaped metal box extending between and secured to the pair of lower supports 104 along the leading end. The support box 118 is mechanically secured to facing inner surfaces of the pair of lower supports 104, for instance, using a weld or other known mechanical fasteners. One skilled in the art should appreciate that other shapes and design are possible. For, instance, the support box 118 could be manufactured in a tubular or plate shape.

As shown, the second extension receiving brackets 120 are disposed and secured to the support box 118 along the leading end of the lower supports 104. More particularly, each second extension receiving bracket 120 is secured to an upper surface of the support box 118 and extends away therefrom. Each second extension receiving bracket 120 includes support arm receiving space and a fastener receiving through-hole 132 extending completely there through. The pair of second actuator receiving brackets 122 are also disposed along and mechanically secured to the support box 118. In the shown embodiment, each second actuator receiving bracket 122 is an eye bracket. However, one skilled in the art should appreciate other known brackets or braces could be used. In addition, one skilled in the can appreciate that one or more actuator receiving brackets can be used and positioned at different locations along support box 118.

As shown in FIGS. 5 and 6, the pair of lower lifting actuators 124 are positioned between and connecting the frame 10 and the first extension section 102. Each lower lifting actuator 124 includes an actuator section 126 and a pair of fastener sections 128. More particularly, in the shown embodiment, each actuator section 126 is a known hydraulic cylinder having a barrel, a piston, piston rod, seals, and seal glands. However, one skilled in the art should appreciate that other actuator systems operated by a source of energy, such as electric current, hydraulic fluid pressure, or pneumatic pressure. In the shown embodiment, each fastener section 128 is a rod clevis positioned at opposite ends of the actuator section 126. One skilled in the art should appreciate that other known fasteners may be used that is capable of connecting between the frame 10 and the first extension section 102 through the pair of lower lifting actuators 124.

Now, with reference to FIGS. 5 and 7, the second extension section 134 is shown and includes a pair of middle supports 136, a pair of sliding supports 140, a first sliding cross member 148, a second sliding cross member 154, a sliding actuator 164, and a pair of upper lifting actuators 172.

The pair of middle supports 136 are elongated structural beams and, in the shown embodiment, a pair of tubular metal beams. Each middle support 136 includes a fastener receiving through-hole 138 positioned at a trailing end thereof and extending completely there through. The pair of middle supports 136 are positioned parallel to each other and connected to each other by first sliding cross member 148.

As shown, each sliding support 140 is an elongated structural beams having a middle support receiving passageway 142 opening from a trailing end thereof and extending there through a body of sliding support 140. The middle support receiving passageway 142 is shaped to receive the middle support 136 and, as shown, a cross section area of the middle support receiving passageway 142 is larger than a cross section area of the middle support 136. As a result, a leading end of the middle support 136 is positioned through the middle support receiving passageway 142.

In the shown embodiment, each sliding support 140 is a tubular metal beam. Each sliding support 140 includes a fastener receiving through-hole 144 positioned at a leading end thereof and extending completely there through. The pair of sliding supports 140 are positioned parallel to each other and connected to each other by the second sliding cross member 154 between the trailing end and the leading end. In the shown embodiment, each sliding support 140 includes a second actuator receiving bracket 146 disposed along and mechanically secured to a bottom surface thereof. In the shown embodiment, each second actuator receiving bracket 146 is an eye bracket. However, one skilled in the art should appreciate that other designs and configurations are possible.

The first sliding cross member 148 is positioned at and connected to the trailing end of the middle supports 136. The first sliding cross member 148 includes a support beam 150 and a sliding actuator brackets 152. In the shown embodiment, the support beam 150 is a metal structural support extending between and secured to the pair of middle supports 136. The support beam 150 is mechanically secured to facing inner surfaces of the pair of middle supports 136, for instance, using a weld or other known mechanical fasteners. One skilled in the art should appreciate that other shapes and design are possible.

The sliding actuator brackets 152 is disposed along and mechanically secured to the support beam 150 about a proximate middle portion thereof and positioned to extend toward a leading end of the second extension section 134. In the shown embodiment, sliding actuator bracket 152 is an eye bracket. However, one skilled in the art should appreciate other known brackets or braces could be used. In addition, one skilled in the can appreciate that one or more actuator receiving brackets can be used and positioned at different locations along support beam 150

As shown in FIG. 7, the second sliding cross member 154 includes a pair of extension plates 158, a cross support 156, a sliding actuator bracket 160, and a pair of tilting actuator brackets 162. The extension plates 158 are metal plates disposed along a leading end of the section extension section 134. More particularly, each extension plate 158 is secured to and secured to facing inner surfaces of the sliding supports 140 and extends below and away from a bottom surface of the sliding supports 140. In the shown embodiment, the cross support 156 is a triangular shaped metal plate. However, one skilled in the art should appreciate that other mechanically supports are possible, including tubular beams and various shaped metal supports. The cross support 156 is positioned between the pair of extension plates 158. In the shown embodiment, the cross support 156 is mechanically secured to facing inner surfaces of the pair of extension plates 158, for instance, using a weld or other known mechanical fasteners. The sliding actuator brackets 160 is disposed along and mechanically secured to the cross support 156 about a proximate middle portion thereof and is positioned to extend toward a trailing end of the second extension section 134. In the shown embodiment, sliding actuator bracket 160 is an eye bracket. However, one skilled in the art should appreciate other known brackets or braces could be used. In addition, one skilled in the can appreciate that one or more actuator receiving brackets can be used and positioned at different locations along cross support 156.

The sliding actuator 164 is positioned between and connecting the first sliding cross member 148 and the second sliding cross member 154. Each sliding actuator 164 includes an actuator section 166 and a pair of fastener sections 168. More particularly, in the shown embodiment, each actuator section 166 is a known hydraulic cylinder having a barrel, a piston, piston rod, seals, and seal glands. However, one skilled in the art should appreciate that other actuator systems operated by a source of energy, such as electric current, hydraulic fluid pressure, or pneumatic pressure. In the shown embodiment, each fastener section 168 is a rod clevis positioned at opposite ends of the actuator section 126. One skilled in the art should appreciate that other known fasteners may be used that is capable of connecting the first sliding cross member 148 and the second sliding cross member 154.

The pair of upper lifting actuators 172 are positioned between and connecting the first extension section 102 and the second extension section 134. Each upper lifting actuator 172 includes an actuator section 174 and a pair of fastener sections 176. More particularly, in the shown embodiment, each actuator section 174 is a known hydraulic cylinder having a barrel, a piston, piston rod, seals, and seal glands. However, one skilled in the art should appreciate that other actuator systems operated by a source of energy, such as electric current, hydraulic fluid pressure, or pneumatic pressure. In the shown embodiment, each fastener section 176 is a rod clevis positioned at opposite ends of the actuator section 126. One skilled in the art should appreciate that other known fasteners may be used that is capable of connecting the first extension section 102 and the second extension section 134.

Figure 8:
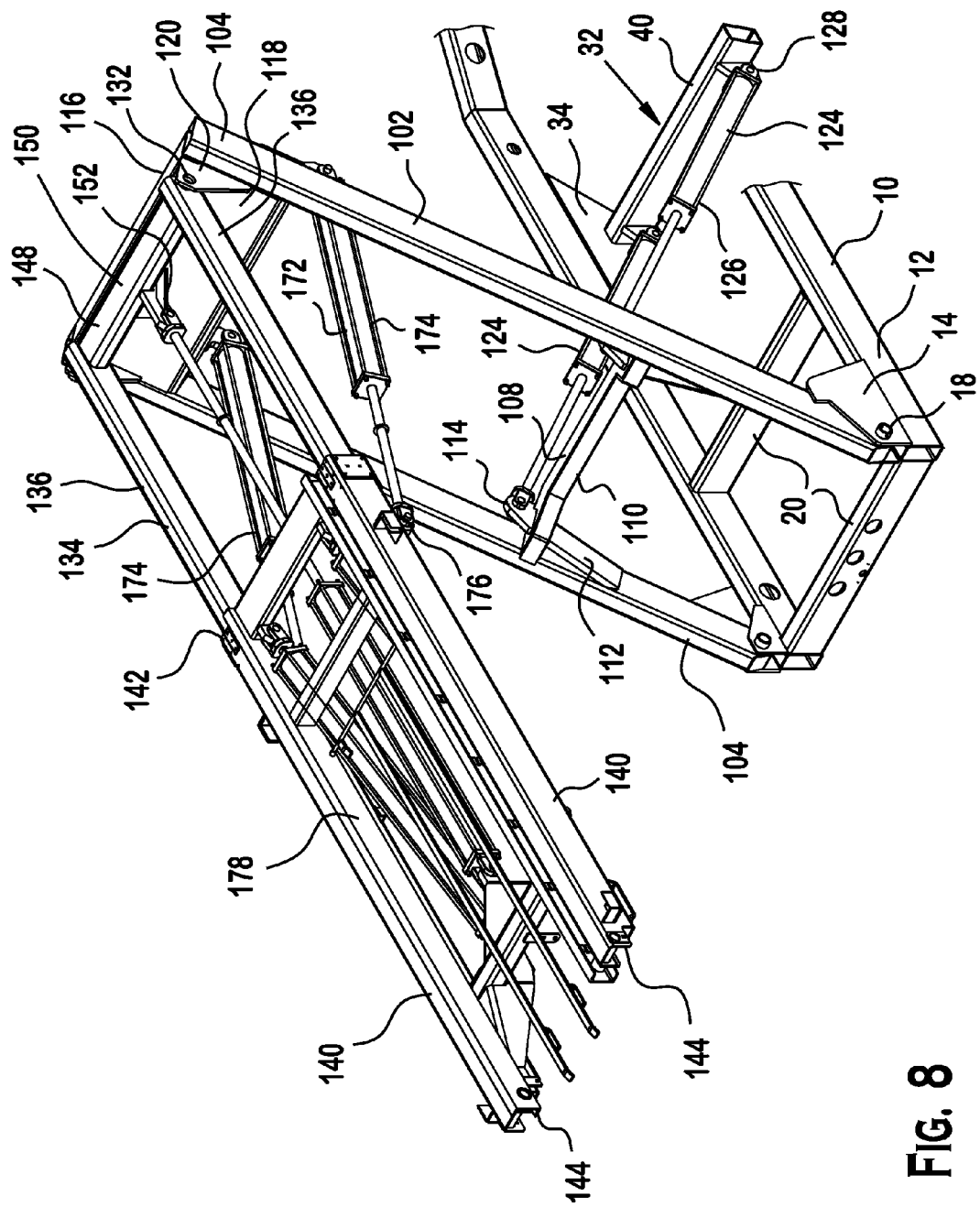
FIG. 8 is another perspective view of yet another part of the extension device of FIG. 5.
Figure 9:
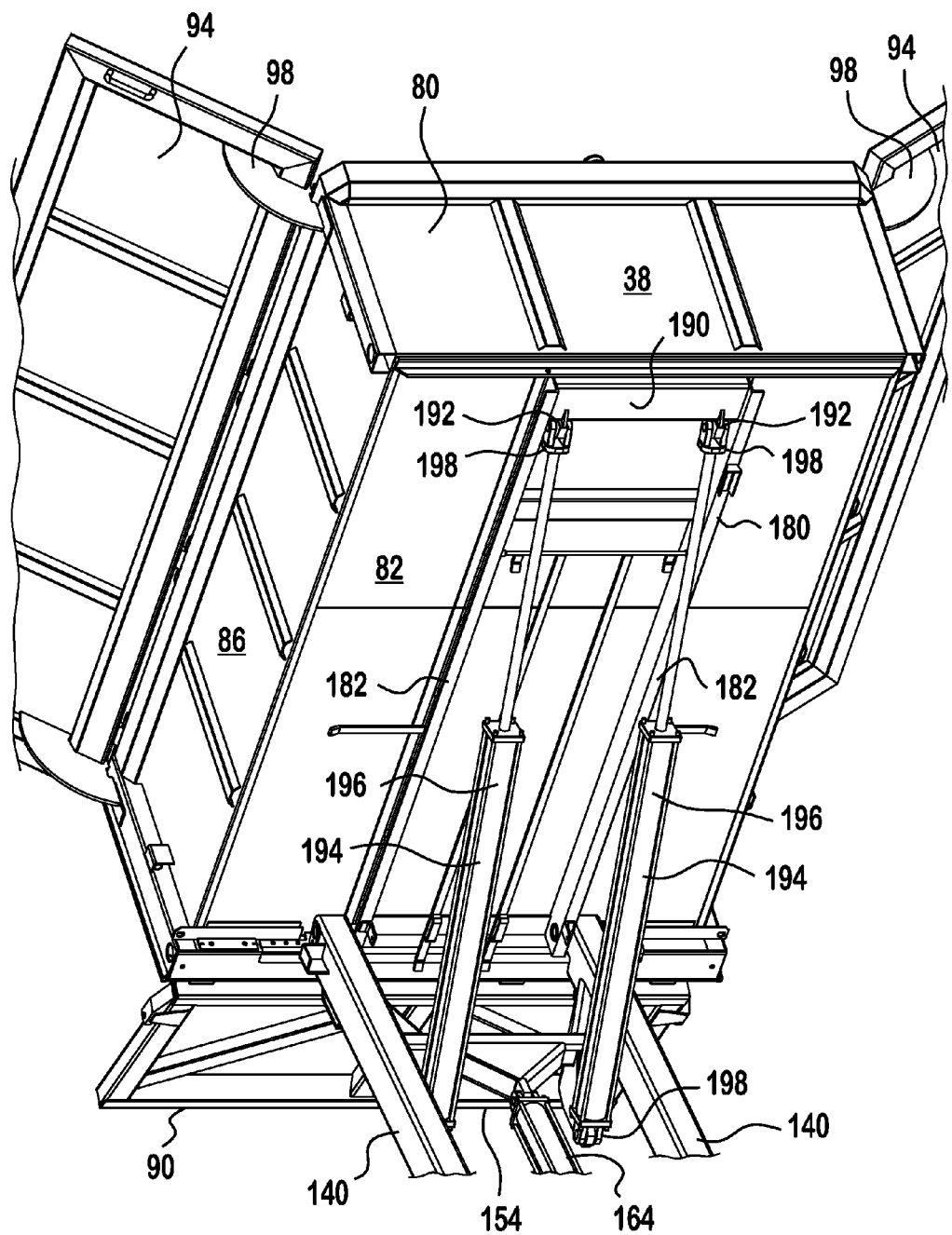
FIG. 9 is a close up perspective view of a storage bin platform section of a trailer according to the invention.

With reference to FIGS. 5, 8, and 9, the storage bin platform section 178 is shown and includes a platform 180, a platform cross member 186, a tilting actuator cross member 188, and a pair of bin tilting actuators 194.

In the shown embodiment, the platform 180 includes a pair of platform beams 182 extending parallel to each other and a pair of through-holes 184 disposed at a trailing ends of the platform beams 182 and extending there through. In the shown embodiment, each platform beam 182 is an I-shaped metal beam. However, one skilled in the art should appreciate that other mechanically supports are possible, including tubular beams and various shaped metal supports.

The platform cross member 186 is a metal structural support extending between and secured to the pair of platform beams 182. In particular, the platform cross member 186 is mechanically secured to facing inner surfaces of the pair of platform beams 182, for instance, using a weld or other known mechanical fasteners. One skilled in the art should appreciate that other shapes and design are possible.

The tilting actuator cross member 188 is positioned at and connecting to a leading end of the platform 180. In particular, the tilting actuator cross member 188 includes a support beam 190 and a pair of tilting actuator brackets 192. In the shown embodiment, the support beam 190 is metal structural support extending between and secured to the pair of platform beams 182. The support beam 190 is mechanically secured to facing inner surfaces of the pair of platform beams 182, for instance, using a weld or other known mechanical fasteners. One skilled in the art should appreciate that other shapes and design are possible. The pair of tilting actuator brackets 192 are disposed along and mechanically secured to the support beam 190 about opposite ends thereof and positioned to extend toward a trailing end of the storage bin platform section 178. In the shown embodiment, each tilting actuator bracket 192 is an eye bracket. However, one skilled in the art should appreciate other known brackets or braces could be used. In addition, one skilled in the can appreciate that one or more actuator receiving brackets can be used and positioned at different locations along support beam 190

The pair of bin tilting actuators 194 are positioned between and connecting the second extension section 134 and the platform 180. Each bin tilting actuator 194 includes an actuator section 196 and a pair of fastener sections 198. More particularly, in the shown embodiment, each actuator section 196 is a known hydraulic cylinder having a barrel, a piston, piston rod, seals, and seal glands. However, one skilled in the art should appreciate that other actuator systems operated by a source of energy, such as electric current, hydraulic fluid pressure, or pneumatic pressure. In the shown embodiment, each fastener section 198 is a rod clevis positioned at opposite ends of the actuator section 126. One skilled in the art should appreciate that other known fasteners may be used that is capable of connecting between the second extension section 134 and the platform 180 through the pair of bin tilting actuators 194.

Now with referenced to FIG. 1-9, assembly of trailer 1 according to the invention will be described.

As shown in FIGS. 1-4 and with reference to the frame 10, the plurality of support beams 12 are positioned parallel to each other and secured in place using the plurality of connection beams 20 and the first actuator support 32. Each connection is provided, for instance, using a mechanical weld. However, one skilled in the art should appreciate that fasteners, such as bolts, nuts, screws, and adhesives could be used.

The drive wheels 24 are positioned under the undercarriage chassis 30 and connected to the drive system 60 using a known transmission. Likewise, the steerable wheels 28 and the stabilizer 50 are also connected to the drive system 60 and, in particular, to the control system 72 having the plurality of controls which may be a series of buttons, levers, or other suitable controls which allow the operator to control retracting and lowering and steering of the steerable wheels 28 and power to the drive wheels 24, as well as adjusting the stabilizer 50.

As shown in FIGS. 1-4, the retaining walls 84 are firmly secured to the platform 82 using mechanical welds. The tailgate 90 is secured to the leading end of the platform 82 using the rotating hinge 92, while each cover section 94 is secured along the upper outer edges of the pair of side retaining walls 86 using the plurality of hinges 96, such that each cover section 94 can rotate toward each other.

As shown in FIGS. 5-9, the extension device 100 is secured to frame 10. In particular, the trailing end of the first extension section 102 is secured to the trailing end of the frame 10. The lower supports 104 are positioned with the support arm receiving spaces 16, such that the fastener receiving through-holes 18 and the fastener receiving through-holes 106 are aligned. A fastener, such as a locking pin, is positioned through each of the respective fastener receiving through-holes 18 and the support arm receiving spaces 16. The fastener is then secured and the lower supports 104 are rotatably mounted to the frame 10. One skilled in the art should appreciate that other fasteners could be used, including, nuts and bolts, screws, and pins.

Furthermore, the pair of lower lifting actuators 124 also secure the frame 10 to first extension section 102. In particular, on end of each lower lifting actuators 124 is secured to one of the pair of actuator receiving brackets 42 of the first actuator support 32, while the opposite end is secured to one of the first actuator receiving brackets 11. The lower lifting actuators 124 are connected to the drive system 60 using hoses and, in particular, to the hydraulic motor (not shown)

As shown in FIGS. 5 and 7, a leading end of the first extension section 102 is secured a trailing end of the second extension section 134. In particular, the pair of second extension receiving brackets 120 of the lower supports 104 are positioned to correspond with the fastener receiving through-hole 138 of the middle supports 136. Again, a fastener, such as a locking pin, is used to rotatably mount the lower supports 104 and the middle supports 136. One skilled in the art should appreciate that other fasteners could be used, including, nuts and bolts, screws, and pins.

As shown in FIG. 7, each middle support 136 is positioned in one of the pair of sliding supports 140 and, in particular, each middle support 136 is positioned in the middle support receiving passageway 142 such that a length of the second extension section 134 can change as the middle support 136 slides in and out of the middle support receiving passageway 142.

Furthermore, the pair of upper lifting actuators 172 connect to both the first extension section 102 and the second extension section 134. In particular, one fastener section 176 connects to the second actuator receiving bracket 146, while the other fastener section 176 connects to the second actuator receiving brackets 122. In addition, the sliding actuator 164 connects to the first sliding cross member 148 and the second sliding cross member 154. One fastener sections 168 is connected to the sliding actuator bracket 160 of the second sliding cross member 154, while the other fastener section 168 is connected to the sliding actuator bracket 152 of the first sliding cross member 148. Both the upper lifting actuators 172 and the sliding actuator 164 are connected to the drive system 60 using hoses and, in particular, to the hydraulic motor (not shown).

As shown in FIGS. 5, 8, and 9, the second extension section 134 connects to the storage bin platform section 178. The through-holes 184 of the platform beams 182 are positioned to correspond with fastener receiving through-holes 144 of the sliding supports 140. A fastener, such as a locking pin, is used to rotatably mount the second extension section 134 with the to the storage bin platform section 178. One skilled in the art should appreciate that other fasteners could be used, including, nuts and bolts, screws, and pins.

Furthermore, the bin tilting actuators 194 connect to the second extension section 134 and the platform 180. In particular, each fastener sections 198 connects to the tilting actuator bracket 162 of the second sliding cross member 15, while the other fastener section 198 is connected to tilting actuator brackets 192 of the tilting actuator cross member 188. The tilting actuators are connected to the drive system 60 using hoses and, in particular, to the hydraulic motor (not shown).

As shown in FIG. 9, the storage bin 80 is secured to the storage bin platform section 178, for instance, using a mechanical weld. However, one skilled in the art should appreciate that other fastening mechanisms could be used, including, nuts and bolts, screws, and adhesives.

Figure 10:
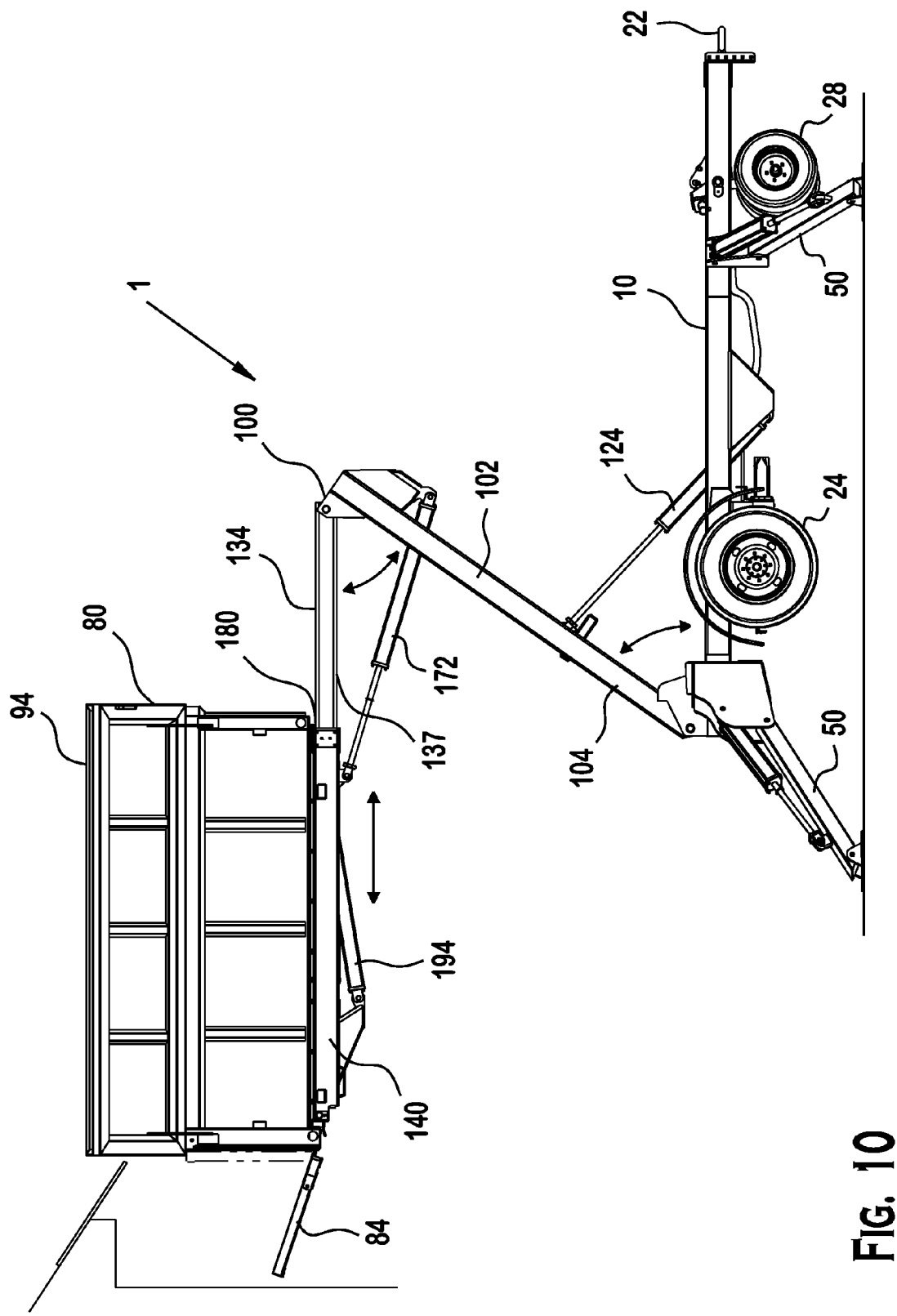
FIG. 10 is a side view of a trailer according to the invention showing extension of a storage bin using the extension device.
Figure 11:
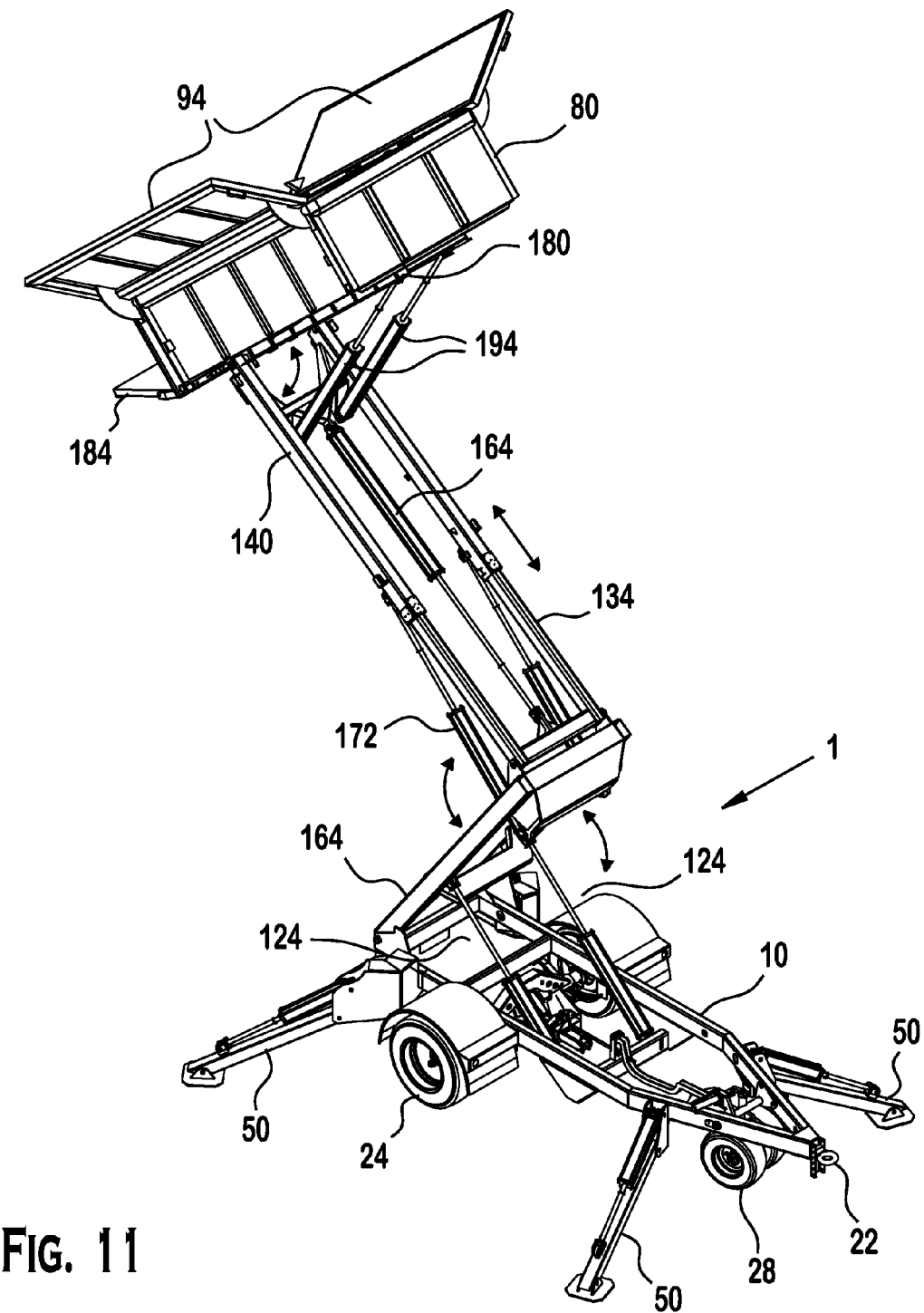
FIG. 11 is a perspective view of the trailer according to the invention showing extension and inclination of the storage bin.

Now with reference to FIGS. 1, 10, and 11, operation of the trailer 1 according to the invention will be described.

Building materials can be loaded and secured in the storage bin 80 at a location different than the work site. A truck (not shown) connects to the frame 10 using the trailer hitch 22. The operator raises the steerable wheels 28 and drive wheels 24 are set to disengage with drive system 60 using the control system 72. The trailer 1 then can operate as a standard trailer and be towed behind the connected truck to the work site.

The operator lowers the steerable wheels 28 so that they can support the frame 10 and disconnects the frame 10 from the truck. The operator then uses the control system 72 to move the trailer 1 to a desired location on the work site using the drive system 60, as described above. The operator may now use the control system 72 to stabilize the trailer 1.

Once the operator has determined that the trailer 1 is in position to unload building materials from the storage bin 80, the operator can manage the stabilizers 50 to stabilize and level the trailer 1. The operator then uses the control system 72 to control the extension device 100 and position of the storage bin 80.

The operator can use the control system 72 to control the vertical and horizontal position of the storage bin 80 using the lower lifting actuator 124, the upper lifting actuators 172, and the sliding actuator 164. By adjusting the different angles of the first extension section 102, the second extension section 134, and the storage bin platform section 178 with respect to each other and the frame 10, the operator can adjust the height of the storage bin 80. In addition, the operator can slide the storage bin 80 horizontally with respect to frame 10. As shown in FIG. 10, the storage bin 80 can be positioned behind the trailing end of the frame 10. In addition, using the bin tilting actuators 194, the operator can adjust tilting of the storage bin 80, such that leading end of the storage bin 80 is positioned away from the sliding supports 140.

The foregoing illustrates some of the possibilities for practicing the invention. Many other embodiments and fields of use for the trailer 1 are possible and within the scope and spirit of the invention. It is, therefore, intended that the foregoing description be regarded as illustrative rather than limiting.

What is claimed is:

1. A self-propelled trailer comprising:
   a frame;
   an extension device having a first extension section with a trailing end rotatably connected to a trailing end of the frame and an extendable second extension section rotatably connected to a leading end of the first extension section, the extendable second extension section having:
   a pair of middle supports connected to the leading end of the first extension section;
   a pair of sliding supports receiving the pair of middle supports, each sliding support of the pair of sliding supports includes a middle support receiving passageway from a trailing end thereof and is shaped to receive one of the pair of middle supports;
   a first sliding cross member having a support beam and a first sliding actuator bracket extending from the support beam toward the pair of sliding supports, the first sliding cross member positioned between and connecting to a trailing end of the pair of middle supports; and
   a second sliding cross member positioned between and connecting the pair of sliding supports; and
   a storage bin secured to a leading end of the extendable second extension section.

2. The self-propelled trailer of claim 1, further comprising a sliding actuator positioned between and connecting the first sliding cross member and the second sliding cross member.

3. The self-propelled trailer of claim 2, further comprising a pair of upper lifting actuators connecting the first extension section and the extendable second extension section.

4. The self-propelled trailer of claim 3, wherein the pair of upper lifting actuators connect the first extension section to the pair of sliding supports.

5. The self-propelled trailer of claim 1, further comprising a storage bin platform section rotatably connected to a leading end of the extendable second extension section.

6. The self-propelled trailer of claim 5, wherein the storage bin platform section includes a platform connected to the storage bin and a tilting actuator cross member to a leading end of the platform.

7. The self-propelled trailer of claim 6, further comprising a pair of bin tilting actuators connecting the extendable second extension section and the platform.

8. The self-propelled trailer of claim 7, wherein the lower cross member support includes a lower support plate connecting to facing inner surface of the pair of lower supports.

9. The self-propelled trailer of claim 8, wherein the lower cross member support further includes a pair of braces positioned at opposite ends of the lower support plate and along inner surfaces of the pair of lower supports.

10. The self-propelled trailer of claim 8, wherein the lower cross member support further includes a pair of first actuator receiving brackets disposed along and mechanically secured to the lower support plate.

11. The self-propelled trailer of claim 1, wherein the frame includes a pair of support beams and a first actuator support connecting the pair of support beams.

12. The self-propelled trailer of claim 11, further comprising a pair of lower lifting actuators connected to the first extension section and the first actuator support.

13. The self-propelled trailer of claim 12, wherein the first actuator support includes a cross member connecting to the pair of support beams and a pair of actuator receiving brackets extending from the cross member.

14. The self-propelled trailer of claim 13, wherein the pair of lower lifting actuators connect to the lower cross member support and the pair of actuator receiving brackets.

15. The self-propelled trailer of claim 14, wherein the frame includes a support arm receiving space receiving and connecting with the pair of lower supports.

16. The self-propelled trailer of claim 1, wherein the first extension section further includes an upper extension support connecting a leading end of the pair of lower supports.

17. The self-propelled trailer of claim 16, wherein the upper extension support includes a support box connecting the pair of lower supports and a pair of second extension receiving brackets connecting with the extendable second extension section.

18. The self-propelled trailer of claim 17, further comprising a pair of upper lifting actuators connecting the first extension section and the extendable second extension section.

19. The self-propelled trailer of claim 18, wherein the pair of upper lifting actuators connect to the upper extension support and the extendable second extension section.

20. A trailer comprising:
   a frame;
   an extension device having a first extension section connected to the frame and a second extension section connected to the first extension section;

a storage bin platform section connected to the second extension section and extendable therefrom; and a tilting storage bin rotatably secured to the storage bin platform section;

wherein the second extension sections includes a pair of middle supports connected to the first extension section and a pair of sliding supports positioned parallel to and extendable from the pair of middle supports.

21. The trailer of claim 20, further comprising a pair of drive wheels positioned under the frame and powered by a drive system.

22. The trailer of claim 21, further comprising a steerable front wheel positioned between a leading end of the frame and the pair of drive wheels and connected to the drive system.

23. The trailer of claim 22, further comprising a front wheel retraction system connected to the frame and the steerable front wheel.

24. A self-propelled trailer comprising:
a frame;
an extension device having a first extension section with a trailing end rotatably connected to the frame and an extendable second extension section rotatably connected to a leading end of the first extension section, the extendable second extension section having:
  a pair of middle supports connected to the leading end of the first extension section; and
  a pair of sliding supports having middle support receiving passageways from a trailing end thereof to receive the pair of middle supports;
  a first sliding cross member having a support beam and a first sliding actuator bracket extending from the support beam toward the pair of sliding supports, the first sliding cross member positioned between and connecting to a trailing end of the pair of middle supports; and
  a second sliding cross member having a cross support connecting to the pair of sliding supports and a second sliding actuator bracket extending from the cross support and extending to the first sliding cross member, the second sliding cross member positioned between and connecting the pair of sliding supports; and
a storage bin secured to the extension device.

25. The self-propelled trailer of claim 24, further comprising a sliding actuator positioned between and connecting the first sliding cross member and the second sliding cross member.

26. The self-propelled trailer of claim 25, further comprising a pair of upper lifting actuators connecting the first extension section and the extendable second extension section.

27. The self-propelled trailer of claim 26, wherein the pair of upper lifting actuators connect the first extension section to the pair of sliding supports.

28. A self-propelled trailer comprising:
a frame having a pair of support beams and a first actuator support connecting the pair of support beams;
an extension device having a first extension section with a trailing end rotatably connected to the frame and an extendable second extension section rotatably connected to a leading end of the first extension section, the first extension section having a pair of lower supports and a lower cross member support with a lower support plate connecting to pair of lower supports, wherein the lower cross member support includes a lower support plate connecting to facing inner surface of the pair of lower supports;
a storage bin secured to the extension device; and
a pair of lower lifting actuators connected to the first extension section and the first actuator support.

29. The self-propelled trailer of claim 28, wherein the lower cross member support further includes a pair of braces positioned at opposite ends of the lower support plate and along inner surfaces of the pair of lower supports.

30. The self-propelled trailer of claim 28, wherein the lower cross member support further includes a pair of first actuator receiving brackets disposed along and mechanically secured to the lower support plate.

31. The self-propelled trailer of claim 28, wherein the first actuator support includes a cross member connecting to the pair of support beams and a pair of actuator receiving brackets extending from the cross member.

32. A self-propelled trailer comprising:
a frame having a pair of support beams and a first actuator support connecting the pair of support beams;
an extension device having a first extension section with a trailing end rotatably connected to the frame and an extendable second extension section rotatably connected to a leading end of the first extension section, the first extension section includes a pair of lower supports and a lower cross member support connecting the pair of lower supports, the first extension section further includes an upper extension support connecting a leading end of the pair of lower supports and having a support box connecting the pair of lower supports and a pair of second extension receiving brackets connecting with the extendable second extension section; and
a storage bin secured to the extension device.

33. The self-propelled trailer of claim 32, further comprising a pair of upper lifting actuators connecting the first extension section and the extendable second extension section.

34. The self-propelled trailer of claim 33, wherein the pair of upper lifting actuators connect to the upper extension support and the extendable second extension section.

35. A self-propelled trailer comprising:
a frame;
an extension device having a first extension section with a trailing end rotatably connected to a trailing end of the frame and an extendable second extension section rotatably connected to a leading end of the first extension section; and
a storage bin secured to a leading end of the extendable second extension section and having a platform, a plurality of retaining walls extending upward from the platform, a tailgate having an end rotatable away from the plurality of retaining walls, a pair of cover sections connected to upper outer edges of the plurality of retaining walls and each cover section of the pair of cover sections is connected to the plurality of retaining walls using a hinge, and a stop disposed along an outer edge of the cover section that connected to the plurality of retaining walls and having a semi-circle shaped plate with a free end configured to abut the one of the plurality of retaining walls.

* * * * *